(12) United States Patent
Potok et al.

(10) Patent No.: US 7,805,446 B2
(45) Date of Patent: Sep. 28, 2010

(54) AGENT-BASED METHOD FOR DISTRIBUTED CLUSTERING OF TEXTUAL INFORMATION

(75) Inventors: Thomas E. Potok, Oak Ridge, TN (US); Joel W. Reed, Knoxville, TN (US); Mark T. Elmore, Oak Ridge, TN (US); Jim N. Treadwell, Louisville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 660 days.

(21) Appl. No.: 10/963,241

(22) Filed: Oct. 12, 2004

(65) Prior Publication Data
US 2006/0080311 A1    Apr. 13, 2006

(51) Int. Cl.
G06F 17/30    (2006.01)
(52) U.S. Cl. .................................... 707/737; 707/778
(58) Field of Classification Search ................ 707/7, 707/102, 737, 776, 777, 778
See application file for complete search history.

(56) References Cited

U.S. PATENT DOCUMENTS

| | | | |
|---|---|---|---|
| 5,864,855 A * | 1/1999 | Ruocco et al. ................ | 707/10 |
| 6,424,971 B1 * | 7/2002 | Kreulen et al. ................ | 707/7 |
| 6,993,517 B2 * | 1/2006 | Naito et al. .................... | 1/1 |
| 7,003,519 B1 * | 2/2006 | Biettron et al. ............... | 707/6 |
| 7,024,400 B2 * | 4/2006 | Tokuda et al. ................. | 706/56 |
| 7,047,236 B2 * | 5/2006 | Conroy et al. ................. | 707/3 |
| 7,502,765 B2 * | 3/2009 | Kummamuru et al. ........ | 706/15 |
| 7,509,314 B2 * | 3/2009 | Hamaguchi .................... | 1/1 |
| 7,610,313 B2 * | 10/2009 | Kawai et al. .................. | 1/1 |
| 7,636,730 B2 * | 12/2009 | Sanfilippo et al. ............ | 1/1 |
| 7,711,668 B2 * | 5/2010 | Brinker et al. ................ | 706/45 |
| 2002/0129015 A1 * | 9/2002 | Caudill et al. ................. | 707/6 |
| 2003/0097276 A1 * | 5/2003 | Kirkland et al. ............... | 705/1 |
| 2003/0120639 A1 * | 6/2003 | Potok et al. .................... | 707/3 |

OTHER PUBLICATIONS

Clack, Autonomous Document Classification for Business, ACM 1997, pp. 201-208.*

Samatova N.F., Ostrouchov G., Geist A., and Melencho, A., "RACHET: A New Algorithm for Mining Multi-Dimensional Distributed Datasets", Third Workshop on Mining Scientific Datasets Apr. 2001.

(Continued)

*Primary Examiner*—Luke S. Wassum
*Assistant Examiner*—Sherief Badawi
(74) *Attorney, Agent, or Firm*—Boyle Fredrickson, S.C.

(57) ABSTRACT

A computer method and system for storing, retrieving and displaying information has a multiplexing agent (20) that calculates a new document vector (25) for a new document (21) to be added to the system and transmits the new document vector (25) to master cluster agents (22) and cluster agents (23) for evaluation. These agents (22, 23) perform the evaluation and return values upstream to the multiplexing agent (20) based on the similarity of the document to documents stored under their control. The multiplexing agent (20) then sends the document (21) and the document vector (25) to the master cluster agent (22), which then forwards it to a cluster agent (23) or creates a new cluster agent (23) to manage the document (21). The system also searches for stored documents according to a search query having at least one term and identifying the documents found in the search, and displays the documents in a clustering display (80) of similarity so as to indicate similarity of the documents to each other.

25 Claims, 5 Drawing Sheets

OTHER PUBLICATIONS

Hofmann T. "Probabilistic Latent Semantic Indexing", Proceedings of the 22nd Annual ACM Conference on Research and Development in Information Retrieval, Aug. 1999.

Xu, Jinxi, and Croft W. Bruce "Cluster-Based Language Models for Distributed Retrieval", Research and Development in Information Retrieval, 1999.

Karypis, George and Han, Eui-Hong "Concept indexing: A fast dimensionality reduction algorithm with application to document retrieval and categorization", University of Minnesota Technical Report TR-00-0016 2000.

Pereira, Fernando C.N., Tishby, Naftali and Lee, Lillian "Distributional Clustering of English Words", Meeting of the Association for Computational Linguistics, 183-190, 1993.

Lagus, Krista, Honkela, Timo, Kaski, Samuel and Kohonen, Teuvo, "Self-organizing maps of document collections: {A} new approach to interactive exploration", Proceedings of the Second International Conference on Knowledge Discovery and Data Mining, 238-243, 1996.

Lewis, David D., Schapire, Robert E., Callan, James P. and Papka, Ron "Training algorithms for linear text classifiers", Proceedings of {SIGIR}-96, 19th {ACM} International Conference on Research and Development in Information Retrieval 298-306, 1996.

Viles, Charles L. and French, James C., "Dissemination of Collection Wide Information in a Distributed Information Retrieval System", Proceedings of the 18th Annual International {ACM} {SIGIR} Conference on Research and Developments in Information Retrieval, Dec. 20, 1995.

Y. Yang, An Evaluation of Statistical Approaches to Text Categorization, School of Computer Science, Carnegie Mellon University, Pittsburg, PA, pp. 1-10.

N. Samatova et al, A Vector Perturbation Approach to the Generalized Aircraft Spare Parts Grouping Problem, Collaborative Technologies Research Center, Oak Ridge National Laboratory, Oak Ridge, Tennessee.

Salton G., et al. "Generation and Search of Clustered Files", ACM Transactions On Database Systems, New York, NY, vol. 3, No. 4, Dec. 1978, pp. 321-346, XP002298148.

Yelon J., et al., "Agents: An Undistorted Representation of Problem Structure", Languages and Compilers for Parallel Computing, Aug. 10, 1995, pp. 551-565, XP000689170.

Jain A.K. et al., "Data Clustering: A review", ACM Computing Surveys, New York, NY, vol. 31, No. 3, Sep. 1999, pp. 264-323, XP002165131.

Can F., "Incremental Clustering for Dynamic Information Processing", ACM Transactions On Information Systems, vol. 11, No. 2, Apr. 1993, pp. 143-164, XP002308022.

Somlo, G. L. et al., "Incremental Clustering for Profile Maintenance in Information Gathering Web Agents", Proceedings of the Annual Conference on Autonomous Agents, New York, vol. Conf. 5, May 28, 2001, p. 262, XP002197051.

* cited by examiner

AGENT-BASED METHOD FOR DISTRIBUTED CLUSTERING OF TEXTUAL INFORMATION

STATEMENT REGARDING FEDERALLY SPONSORED RESEARCH

This invention was made with Government support from the National Reconnaissance Office under Interagency Agreement No. 2295-S571-A1. Additional support has been provided under Contract No. DE-AC05-00OR22725 awarded to UT-Battelle, LLC, by the U.S. Department of Energy. The Government has certain rights in this invention.

TECHNICAL FIELD

The field of the invention is software agents for organizing information from various information sources that are stored in computer memories or on various media for access during search operations.

DESCRIPTION OF THE BACKGROUND ART

One of the main functions of computer technology is to help people to quickly locate some piece of key information that they need. A vast amount of information is available electronically and it can be very difficult to find a single key piece of information using current search engines.

Instead of search engines, information can be gathered and processed using information agents to retrieve the information. These agents provide a number of ways to retrieve and organize information. Information agents are capable of accessing information from multiple sources, and then filtering information by relevance to a user. The most basic systems use non-cooperating agents to perform an information retrieval task. Enhanced systems use cooperating agents and adaptive information agents that can deal with uncertain, incomplete, or vague information. Information agents can efficiently gather heterogeneous and frequently changing information. Systems using agents are generally distributed systems using multiple computers.

Cluster analysis is a method that has been used to categorize information. Commonly, distributed clustering techniques have maintained some form of centralized information gathered from the distributed set of documents. This information must be updated any time a document is added or removed from the document set, which necessitates significant processing, communication and storage capacity. It would be advantageous to provide a distributed clustering method that does not need any centralized repository of information, so that when a document is added or removed from the system there is very little information that must be updated.

In characterizing documents for clustering purposes, a vector space model (VSM) has been used, where each unique word within a collection of documents represents a dimension in space, while each document represents a vector within that multidimensional space. Vectors that are close together in this multidimensional space form clusters, or groups of documents that are similar.

The use of information agents to collect and display information using similarity and clustering methods is described and illustrated in Potok et al. U.S. Pat. Pub. No. US 2003/01207639, published Jun. 26, 2003.

Once the information is collected and parsed into documents, there is a need for effective organization and storage of documents for purposes of search, retrieval, display and evaluation of the documents.

SUMMARY OF THE INVENTION

The invention is incorporated in a computer method and system for organizing and storing information collected from information sources for fast retrieval and presentation, based on grouping of the documents according to similarity.

In the method and computer system of the invention, a first-tier, multiplexing program module operates on a first computer for determining a new document vector to characterize a new document for comparison to other documents stored in the computer system. The first-tier program module transmits the new document vector to a second-tier program module operating on a second computer in the computer system. The second-tier program module later transmits a similarity value to the first-tier program module which represents a comparison of the new document vector to at least one composite vector characterizing a similarity of a group of documents stored in the computer system. Based on the similarity value received from the second-tier program module, the first-tier program module then determines whether the new document should be transmitted to the second-tier program module for storage in the computer system.

In a further aspect of the invention, third-tier and fourth-tier program modules are provided with the fourth-tier modules actually storing similar groups of documents and the third-tier program modules routing documents based on a similar comparison of new document vectors with composite vectors for the fourth-tier modules.

When a new document has been received by a second-tier module, it may route it to a third-tier module or create a new third-tier module if the new document is not similar to the documents stored by the third-tier modules under its supervision.

The entire hierarchy of program modules can be replicated on computers running in parallel under the control of a multiplexing program module to provide for a large scale distributed processing system.

It is one object of the invention to efficiently use storage capacities on a plurality of computers in a multi-computer distributed computing system.

It is another object of the invention to allow expansion of such a distributed computing system.

Other objects and advantages of the invention, besides those discussed above, will be apparent to those of ordinary skill in the art from the description of the preferred embodiments that follows. In the description reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

The present invention is embodied in method utilizing information agents to retrieve and organize information. A number of different types of agents are disclosed, and these are implemented with a communication protocol enabling them to interact. For example, one type of agent gathers information from individual newspapers available on-line, while another type of agent may analyze the articles and organizes the information. Other agents can search the Internet and retrieve web pages from various other websites. As used herein, the term "information source" shall include on-line sources such as websites, and off-line sources such as compilations of information stored in computer memories or on computer media. This includes information downloaded on-line and stored off-line for later processing. Computer media can include floppy disks, hard disks, zip disks, tape drives, CD's, DVD's and other types of storage media, including new technologies to be developed.

Figure 1:
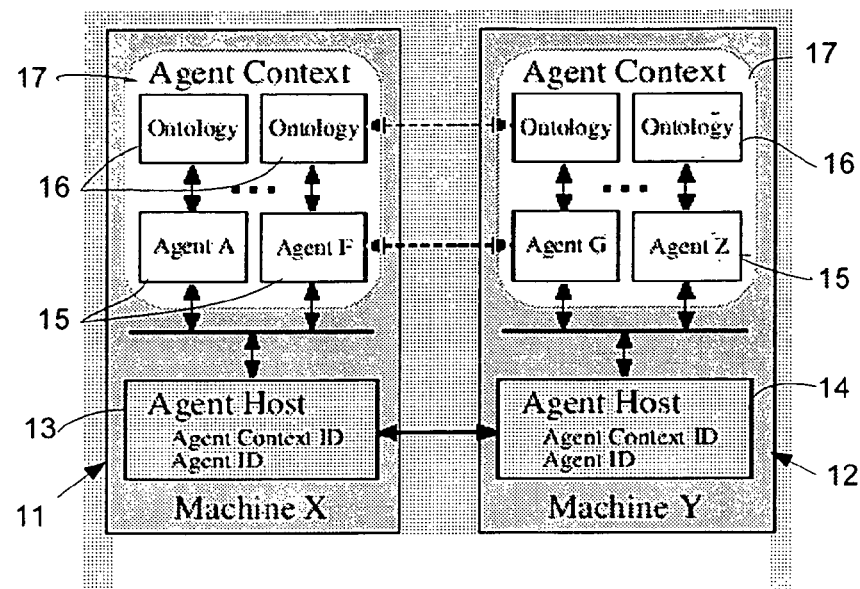
FIG. 1 is a block diagram of the computing environment for operating a plurality of agent programs of the present invention.

FIG. 1 illustrates such a system with multiple agent hosting computers 11, 12, identified as "Machine X" and "Machine Y." Agent hosting programs 13, 14 run on each machine 11, 12 for managing other program modules operating on the hosting computers 11, 12. Computer agent program modules 15 (further identified as A-F and G-Z) can move from one computer to another by changing their association with the agent hosts 13, 14. Agent mobility through the Internet is limited based on the necessary security limitations enforced over the Internet. The agent hosting program uses the Foundation for Intelligent Physical Agent (FIPA) compliant agent communication language (ACL) messages. This allows any FIPA compliant agent to be able to interact with the agent host program.

Associated with some of the agent program modules (only the agent program modules which gather information from the internet) 15 is a Resource Description Framework (RDF) ontology 16 module, allowing each respective computer retrieval agent program module 15 to address an information source, retrieve relevant documents, and format the documents. RDF ontologies 16 move with the computer program agents 15. Also seen in FIG. 1 are the agent context programs segments 17 provide machine specific environments for the agent to work.

When an agent program module 15 is received at a machine 11, 12, the agent host 13, 14 provides it with the agent context 17. This agent context 17 is the agent's interface to the computer 11, 12 it is running on. This provides a program architectural layer for security in the agent host system. The agent programs are written in JAVA and uses JAVA Remote Method Invocation (RMI) for communicating information from one agent to another. The agent host program, as well as the agent program modules, run as applications under an operating system, such as Windows, Unix, Linux, or other known operating systems. Further information regarding this system is provided at http://java.sun.com/j2se/1.5.0/docs/guide/rmi/.

The RDF ontological description 16 for each information source to be monitored includes the following four key elements of information:

1) Traversal directives—site-specific actions for traversing information source. This includes the search depth limit, and the time interval to wait between rechecking the site for new documents.

2) Traversal maps—maps of source information site containing the pages of interest. The map starts with a root from which the agent is to begin a traversal of the source, and from which the agent can resolve relative sub-categories of information found in the source. A rule-based map of the pages of interest on the site is based on the structure of the site and is encoded via regular expressions.

3) Document delimiters—markers to delimit the text of a document from other information on a given page of information. A map of an Internet site includes information used by the retrieval agent to delimit the text of a document from the myriad of other information on the page (boilerplate, banners, advertisements).

4) Document structuring rules—rules for structuring the document text as XML. Again, regular expressions are used to reduce the various structural characteristics of a document, such as the title, author, and paragraphs.

Based on this RDF ontology, a retrieval agent checks each page against the traversal map to determine if the page is of interest. It is noted here that information is retrieved on the basis or one or more pages in the information source, which is then used to create a document or data file for use in the clustering system. Therefore, a document for purposes of the clustering system may only be a portion of a document at the information source.

If the retrieved information, which we shall refer to as a document, is of interest, and new to the system, then the agent retrieves the information in its storage format from the information source, discerning the text from the document delimiters, and cleaning it of extraneous information. The agent then marks up the clean text using XML or another suitable language using tagged identifiers, tagging the parts of the document (title, author, date, location, paragraphs, etc) depending on the site's document structuring rules. The agent continues to monitor the site based on the traversal directives, and posting new information of interest as it becomes available.

Figure 2:
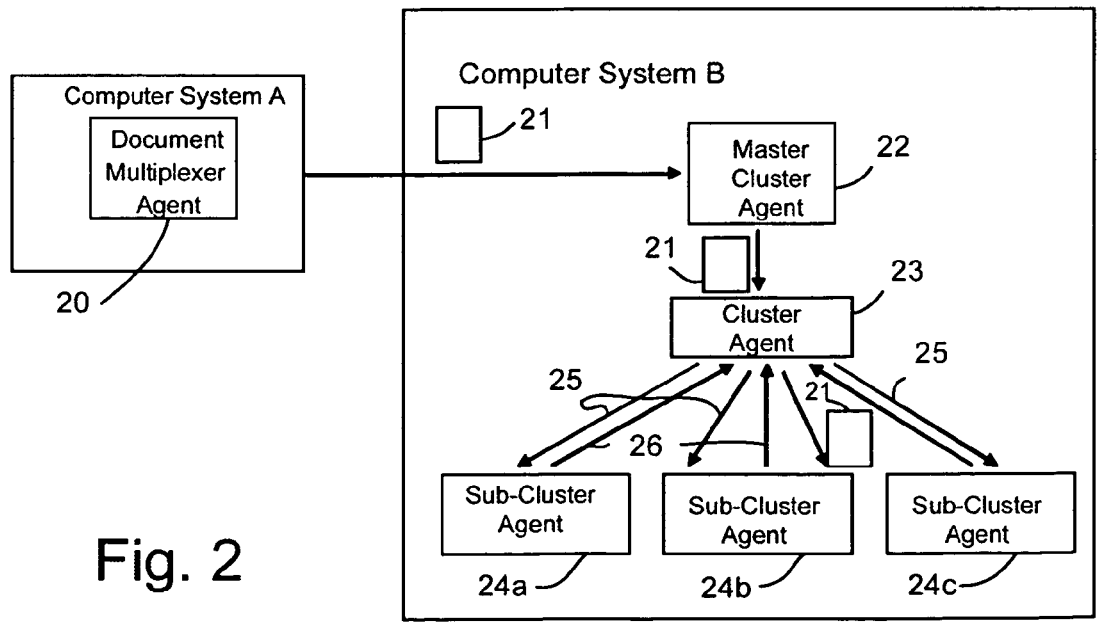
FIG. 2 is a block diagram of agent program modules on one computer with distributed cluster agents according to the present invention.

The present invention is concerned with improving the process by which new information is stored and organized in the system for retrieval and display in a clustering result by a display agent program module. As seen in FIG. 2, computer system A is running a program module known as a document multiplexer agent 20. It is assumed that information has been collected from a plurality of information sources according to respective maps of the network sites and that the collected information has been converted to new XML-language documents for storage in the computer system.

The multiplexer agent program module 20 will communicate such documents 21 to other computers, such as computer system B, and other agent program modules, such as master cluster agent program module 22. The document multiplexer agent 20 calculates a new document vector 25, which represents the content of the new document, and transmits it to the master cluster agent 22.

The master cluster agent program module 22 then forwards the new document vector 25 to one or more cluster agent modules 23. These modules 23 will compare the vector to a composite vector representing all of the documents stored under the control of the cluster agent module 23. The cluster agent modules 23 will return a value to the master cluster agent 22, which will return a "best match" value to the multiplexing agent 20 in this evaluation phase of system operation. Based on the best match values, the multiplexing agent 20 will send the document to a master cluster agent 22, which will then forward it to a cluster agent 23 managing documents of a sufficient measure of similarity as determined by vector comparisons. The cluster agent 23 will then determine a sub-cluster agent 24a-24c where the new document should be sent.

To determine which sub-cluster agent 24a-24c is maintaining documents most similar to the new document 21, the sub-cluster agents are queried 24a-24c. The cluster agent 23 sends a new document vector 25 to each sub-cluster cluster agent 24a-24c to be evaluated.

Each sub-cluster agent 24a-24c has a composite vector that represents the set of documents it contains. This composite vector is used, along with the vector 25 to be evaluated, to obtain a numerical value 26 representing the similarity of the new document to the sub-cluster's document set using the method described above. The reference implementation uses a similarity value, which will be described above. This value 26 is returned to the cluster agent by the sub-cluster agents.

The cluster agent 23 examines all of the numerical values 26 obtained from the sub-cluster agents 24a-24c to determine which sub-cluster agent has the most similar document set. It then sends the document 21 to a sub-cluster agent 24b having a sufficient measure of similarity as determined by vector comparisons, or it can create a new sub-cluster agent.

Figure 3:
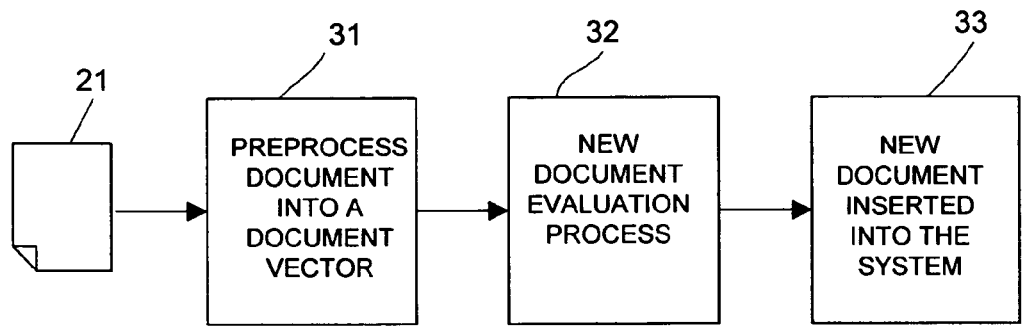
FIG. 3 is a block diagram for adding a document to the distributed clustering system of the present invention.

FIG. 3 shows how a document is evaluated. The document is first converted into a document vector, represented by block 31. The document vector is then evaluated as represented by process block 32. Based on this evaluation, the document is inserted into the system and grouped with similar documents as represented by process block 33.

Figure 4:
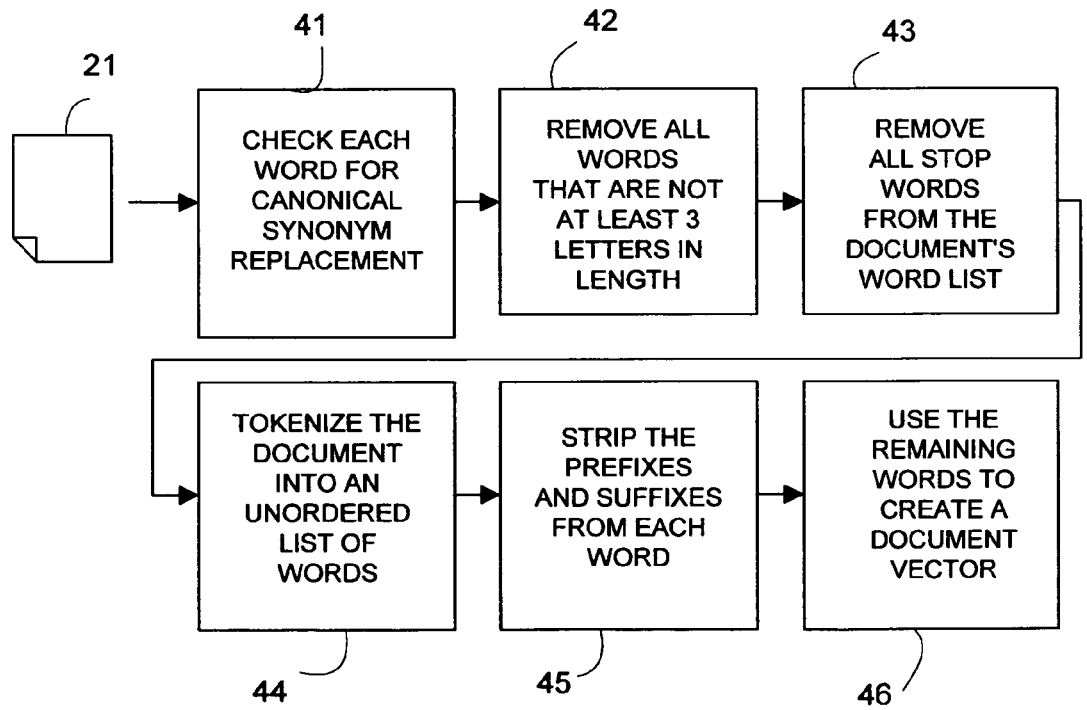
FIG. 4 is a more detailed block diagram of the process of the first block in FIG. 3.

FIG. 4 illustrates how a new piece of information, referred to as a document, is processed to calculate a document vector. As represented by process block 41, each word or phrase is compared with a synonym list and is replaced with a canonical synonym if it exists. While much of the information necessary to accomplish this process is readily available from a thesaurus, much better clustering performance is obtained by adding synonyms from the document sets domain. For example, if the document set contains documents under a common subject heading, then replacing all variants of a certain name or expression with a standardized name or expression will result in improved clustering performance.

Next, as represented by process block 42, all words in the document less than three (3) characters in length are removed. These short words usually have little correlation to the documents main topic and therefore do not need to be included in the document vector.

Then, as represented by process block 43, all common words like "and" and "the" are removed from the document. Lists of these high-frequency words are commonly available and an illustrative list is provided in Appendix A.

The words remaining after the above processes are complete are then processed into an unordered list of unique words called the token list, as represented by process block 44.

Then, as represented by process block 45, each word in the token list has its prefixes and suffixes stripped off in a process called stemming. There are several methods available for stemming. Three common ones are the S-Stemmer, Lovins, J. B. "Development of a Stemming Algorithm," Mechanical Translation and Computational Linguistics, 11, 22-31 (1968), and Porter, M. F. "An algorithm for Suffix Stripping," Program, 14(3), 130-137 (1980). The Porter method was preferred for this clustering method.

As represented by process block 46, the token list resulting from the previous operations is used to create a document vector in a process based on Salton's TFIDF formula disclosed in Salton, G. and Buckley, C. "Term Weighting Approaches in Automatic Text Retrieval," Information Processing and Management, 24(5), 513-523 (1988) and Salton, G. and Lesk, M. "Computer Evaluation of Indexing and Text Processing," Journal of the ACM, 15(1), 8-36 (1968). This document vector contains a weighted value for each token in the token list calculated with the following formula:

$$\omega_t = \log_2(f_t+1) \times \log_2((T+1) \div (O_t+1)) \qquad (1)$$

where $f_t$ is the frequency count of token t, T is the total number of documents in the training set and $O_t$ is the number of documents in the training set that contain the token t. The training set is a large set of documents, preferably similar to the documents being clustered, which are used to improve the accuracy of the token weight. For a prototype, approximately 150,000 newspaper articles formed the collection of documents. The weight for each token in the list is then collected to create a document vector:

$$\vec{V}_D = \{\omega_{t1}, \omega_{t2}, \ldots, \omega_{tm}\} \qquad (2)$$

This vector is then normalized to obtain the final document vector that represents the document:

$$\vec{V}'_D = \frac{\vec{V}_D}{|\vec{V}_D|} \qquad (3)$$

During the evaluation process represented in FIG. 2, the cluster agent 23 uses a composite vector for the comparison, rather than querying each sub-cluster agent 24a-24c. Each sub-cluster agent calculates a single composite vector that represents the set of document vectors for which it is responsible. Likewise, each cluster agent 23 calculates a composite vector that represents the set of composite vectors created by its sub-cluster agents. To calculate the composite vector from a set of document vectors, the document vectors are summed using the common vector addition method. The resulting vector is normalized to obtain the final composite vector that represents the set of documents. Specifically, the equation for a composite vector is:

$$\vec{C} = \frac{\vec{V}_1 + \vec{V}_2}{|\vec{V}_1 + \vec{V}|} \qquad (4)$$

The composite vector that represents a set of composite vectors is calculated in an identical manner.

Figure 5:
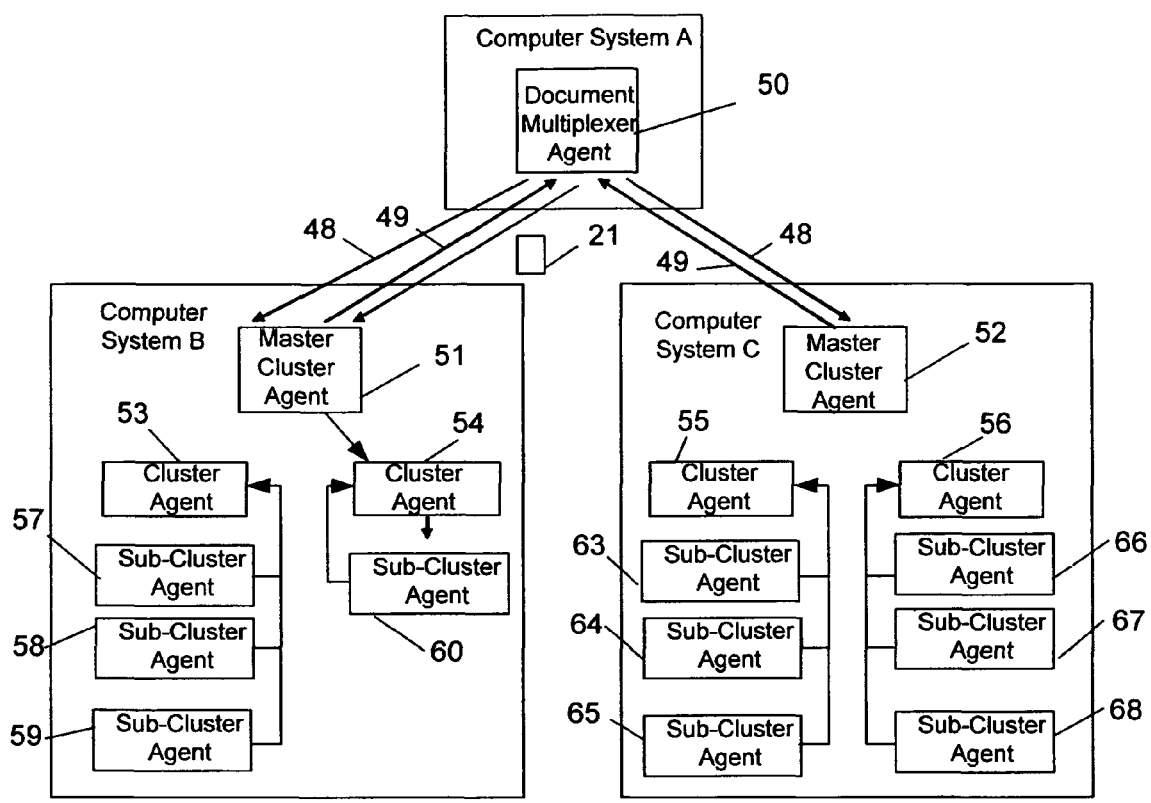
FIG. 5 is a block diagram of a system in which a new sub-agent is created to handle a new type of document.

If during the new document evaluation process it was determined that no similar documents exist in the system, then a new cluster agent needs to be created to represent the new document. FIG. 5 illustrates this process.

The document multiplexer agent 50 transmits a query 48 to all of the master cluster agents 51, 52 in the system about their current load. If during the new document evaluation process, it was determined that no similar documents exist in the system, then a new cluster agent 54 is created to store and manage the new document.

The master cluster agents 51, 52 calculate a numerical load value whose factors can be free system memory, free disk space, system processor load among many others. This load value 49 is returned to the document multiplexer agent 50. For example, the master cluster agents can use the number of cluster agents they are currently managing as their load value.

This is an effective load value since all of the computers systems used for testing were very similar.

The document multiplexer agent 50 determines which master cluster agent is on the computer system with the least load and send the new document and its vector there.

The master cluster agent 51 then creates a new cluster agent 54 and sends the document 21 and its vector there.

The cluster agent 54 creates a new sub-cluster agent 60 and gives it the new document 21 and its representative vector.

Figure 6:
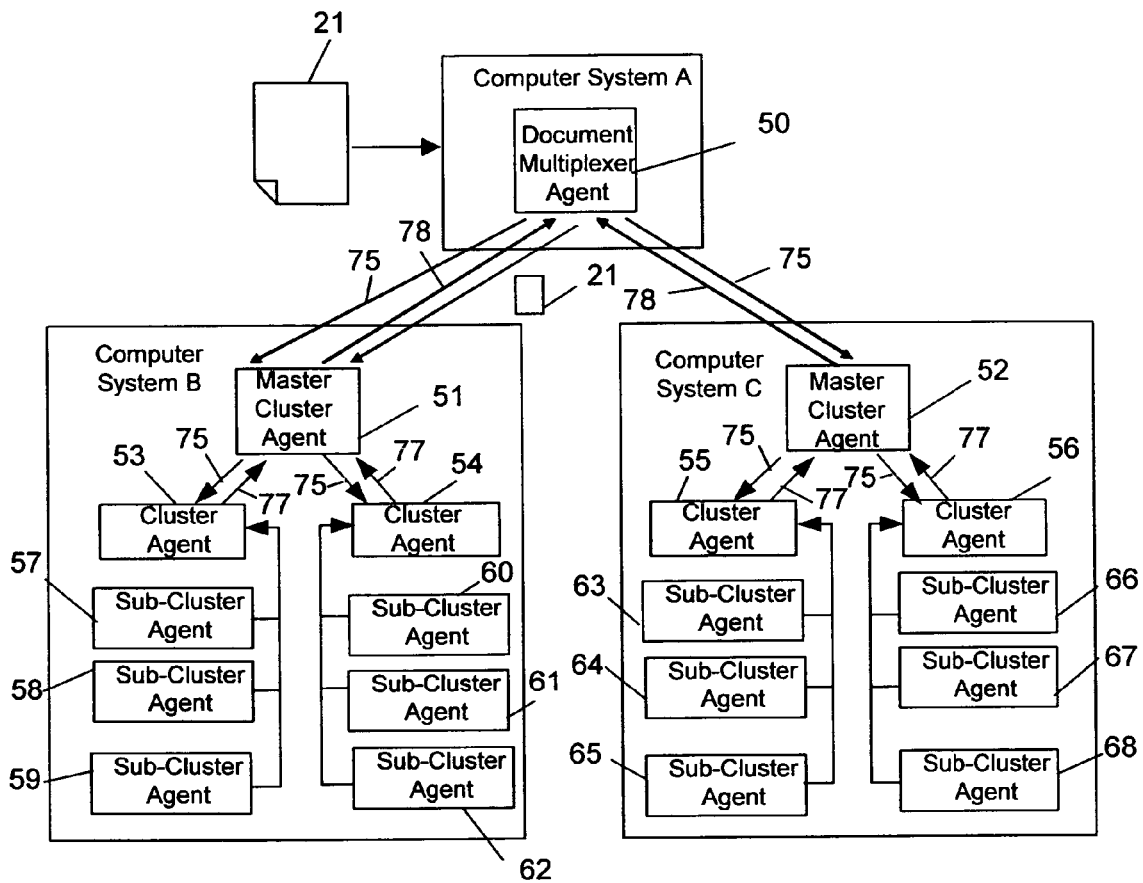
FIG. 6 is a block diagram of agent program modules on two computers for distributed clustering according to the present invention.

FIG. 6 shows a distributed system with computer system A with document multiplexer agent 50, computer system B with a first master cluster agent 51 and computer system C with a second master cluster agent 52. Although the process will described for master cluster agent 51, a parallel process takes place through master cluster agent 52 and its cluster agents 55 and 56.

Each master cluster agent 51 is responsible for several cluster agents 53, 54, each which represent a set of documents that are related. The document set represented by one cluster agent 53 does not necessarily have any relationship to the document set of another cluster agent 54. Therefore, the master cluster agent 51 must send the document vector to each cluster agent 53, 54 for evaluation.

When the cluster agent 53, 54 receives a document vector for evaluation, as represented by the arrow 75, it does not need to query each sub-cluster agent 57-59 and 60-62. As each sub-cluster agent 57-59 and 60-62 is given a new document, the cluster agent 53, 54 re-calculates a composite vector, of the type described above, which represents all of the sub-cluster agent's document holdings. The cluster agents 53, 54 takes the composite vector and the document vector received from the master cluster agent 51 as represented by arrow 76, to evaluate and calculate a dot product, Euclidian distance, or some other measure to obtain a numerical value that represents the similarity between the document vector and the accumulated composite vector. In a prototype implementation, Euclidian distance was used to obtain a similarity value S as follows:

$$S = 1 - \left[ \sqrt{\sum_{\forall (tV \cup tC)} (\omega_{tV} - \omega_{tC})^2} \times \frac{1}{\sqrt{2}} \right] \quad (5)$$

where $\omega_{tV}$ is the weight value of token t in the document vector V and $\omega_{tC}$ is the weight value of token t in the composite vector C. For a pair of vectors that are identical S will be 1.0 and for a set of vectors that have nothing in common S will be 0.

The numerical value calculated by each cluster agent 53, 54 for each sub-cluster agent 57-59 and 60-62 in the system is transmitted to the master cluster agent 51 as represented by arrow 77. The master cluster agent 51 decides which value represents the closest relationship between the document being evaluated and a particular cluster agent and then discards all of the other values.

All of the master cluster agents 51, 52 take their "best match" value 78 and send it up to the document multiplexer agent 50.

Once the document multiplexer agent 50 has received all of the "best match" values 78, it then can make a decision about what to do with the document. The "best match" value will possibly indicate that a set of documents similar to the document being evaluated already exists in the system, or that no documents similar exist in the system. If a set of similar documents exist, then the document will be incorporated into that document set. If no similar sets of document exist in the system, then a new document set needs to be created as described above.

Figure 7:
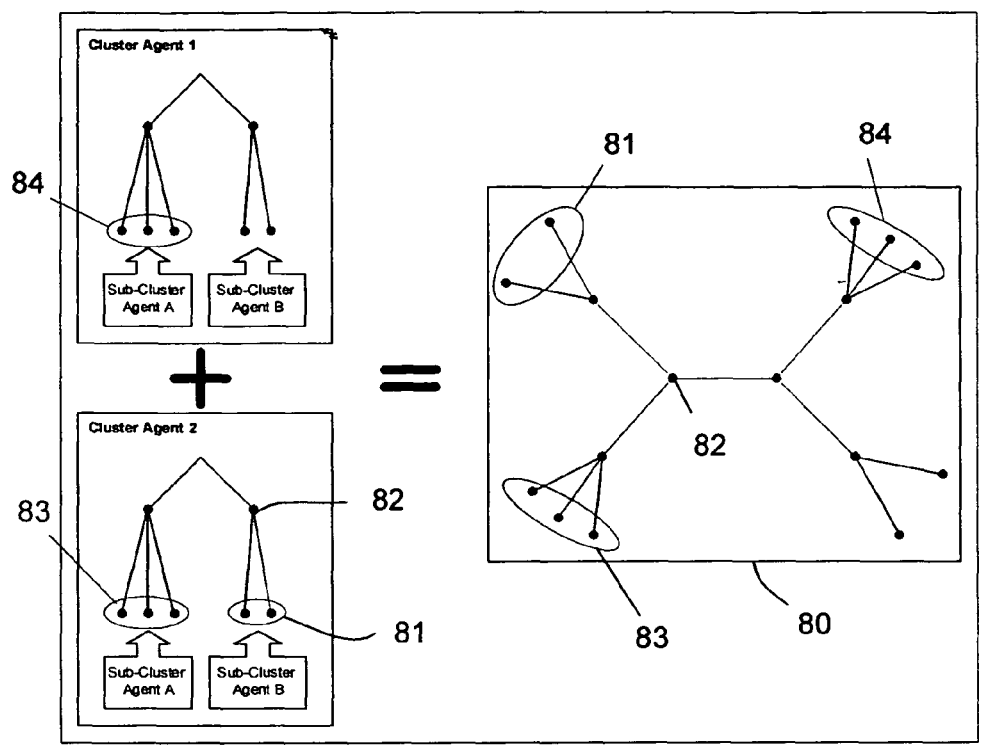
FIG. 7 is a diagram which illustrates the formation of a clustering diagram according to the present invention.

As seen in FIG. 7, the information is presented in a cluster diagramming graph 80 called a Phylips Tree. This diagram is displayed on a screen of a computer display through the operation of an information display agent according to a search query having at least one term, as disclosed in Potok et al. U.S. Pat. Pub. No. US 2003/01207639, published Jun. 26, 2003. To the extent that implementation details of the present invention are disclosed therein, such disclosure is hereby incorporated by reference. The nodes 81 of the tree 80 represent each document while the links 82 between the nodes 81 represent relationships. In general, the closer two nodes 81 are, the more similarity there is between two documents. If links 82 from two nodes share a vertex, then these documents are the closest in the set of documents. The longer the links 82 are between documents, the greater the dissimilarity is between the documents.

As a result of the process used to add documents to the system, the set of documents represented by cluster agent 1, sub-cluster agent A in FIG. 7 are very similar to one another. Likewise, the documents represented by cluster agent 1, sub-cluster B are very similar. These two sets of documents represented by cluster agent 1 are similar, but not as similar as a set of documents held by a single sub-cluster agent. Each cluster agent represents a hierarchy of related documents. These related hierarchies can be joined to create a tree 80.

Figure 8:
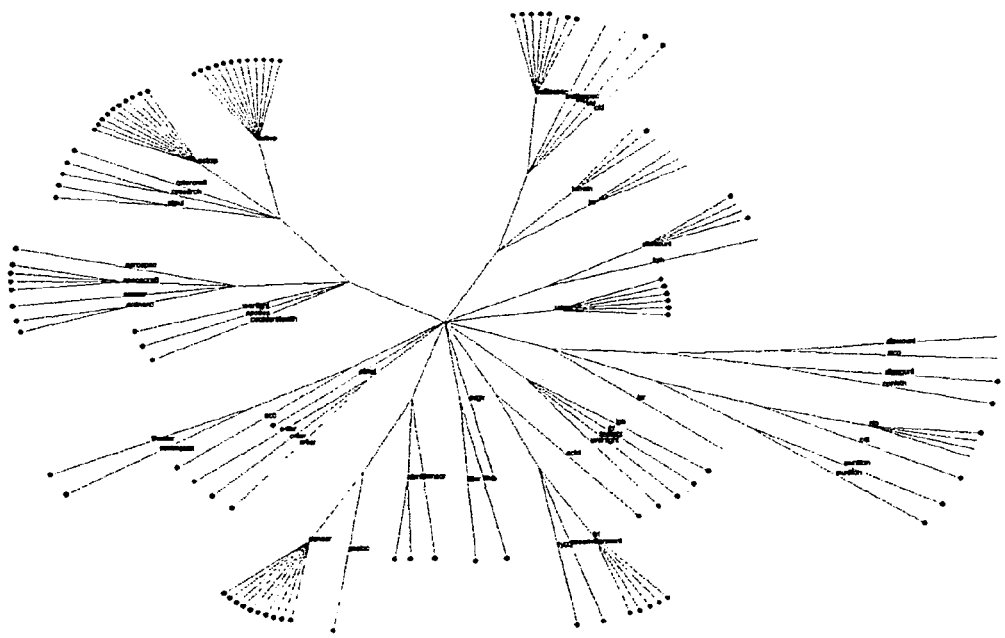
FIG. 8 is an example of a complete clustering diagram resulting from executing the method of the present invention.

In the clustering diagrams of FIGS. 7 and 8, the two documents represented by the two nodes 81 rooted off the same node 82 are very similar. Likewise, the three documents represented by the three nodes 83 are very similar. The two sets of nodes 81 and 83 contained in cluster agent 2 are somewhat similar, but not as similar as the nodes held in a single sub-cluster agent. The three nodes 84 are not very similar at all to the nodes 81 and 83 since they are not held in the same sub-cluster agent or cluster agent and have several non-leaf nodes between them in the tree 80.

This has been a description of the preferred embodiments of the invention. The present invention is intended to encompass additional embodiments including modifications to the details described above which would nevertheless come within the scope of the following claims.

Appendix A

List of Common Words Removed from Documents nbsp
a
about
above
accordingly
across
after
afterwards
again
against
all
allows
almost
alone
along
already
also
although
always -continued am
among
amongst
an
and
another
any
anybody
anyhow
anyone
anything
anywhere
apart
appear
appropriate
are
around
as
aside
associated
at
available
away
awfully
b
back
be
became
because
become
becomes
becoming
been
before
beforehand
behind
being
below
beside
besides
best
better
between
beyond
both
brief
but
by
c
came
can
cannot
cant
cause
causes
certain
changes
co
come
com
consequently
contain
containing
contains
corresponding
could
currently
d
day
described
did
different
do
does
doing
done
down
downwards
during -continued e
each
eg
eight
either
else
elsewhere
email
enough
et
etc
even
ever
every
everybody
everyone
everything
everywhere
ex
example
except
f
far
fax
few
fifth
first
five
followed
following
for
former
formerly
forth
four
from
further
furthermore
g
get
gets
given
gives
go
gone
good
got
great
h
had
hardly
has
have
having
he
hence
her
here
hereafter
hereby
herein
hereupon
hers
herself
him
himself
his
hither
how
howbeit
however
htm
html
http
i
ie
if
ignored
immediate -continued in
inasmuch
inc
indeed
indicate
indicated
indicates
inner
insofar
instead
into
inward
is
it
its
itself
j
just
k
keep
kept
know
l
last
latter
latterly
least
less
lest
life
like
little
long
ltd
m
made
make
man
many
may
me
meanwhile
men
might
mil
more
moreover
most
mostly
mr
much
must
my
myself
n
name
namely
near
necessary
neither
never
nevertheless
new
next
nine
no
nobody
none
noone
nor
normally
not
nothing
novel
now
nowhere
o
of
off -continued often
oh
old
on
once
one
ones
only
onto
or
org
other
others
otherwise
ought
our
ours
ourselves
out
outside
over
overall
own
p
particular
particularly
people
per
perhaps
placed
please
plus
possible
probably
provides
q
que
quite
r
rather
really
relatively
respectively
right
s
said
same
second
secondly
see
seem
seemed
seeming
seems
self
selves
sensible
sent
serious
seven
several
shall
she
should
since
six
so
some
somebody
somehow
someone
something
sometime
sometimes
somewhat
somewhere
specified
specify
specifying -continued state
still
sub
such
sup
t
take
taken
than
that
the
their
theirs
them
themselves
then
thence
there
thereafter
thereby
therefore
therein
thereupon
these
they
third
this
thorough
thoroughly
those
though
three
through
throughout
thru
thus
time
to
together
too
toward
towards
twice
two
u
under
unless
until
unto
up
upon
us
use
used
useful
uses
using
usually
v
value
various
very
via
viz
vs
w
was
way
we
website
well
went
were
what
whatever
when
whence
whenever
where -continued whereafter
whereas
whereby
wherein
whereupon
wherever
whether
which
while
whither
who
whoever
whole
whom
whose
why
will
with
within
without
work
world
would
www
x
y
year
years
yet
you
your
yours
yourself
yourselves
z
zero

We claim:

1. A computer method for storing information in a computer system having at least first and second computers for retrieval and display based on similarity of information, the method comprising:

a first-tier program module operating on a first computer for determining a new document vector to characterize a new document for comparison of a similarity of the new document to other documents stored in the computer system;

the first-tier program module transmitting the new document to a second-tier program module operating on a second computer in the computer system;

wherein the second-tier program module transmits the document vector to a plurality of third-tier program modules operating on the second computer in the computer system;

the third-tier program modules each storing a composite vector representing the similarity of a respective plurality of documents stored in the second computer under control of the respective third-tier program module; and the third-tier program modules each receiving the document vector for the new document and comparing the document vector to a respective composite vector to determine similarity of the new document to the plurality of documents stored in the second computer under the control of the third-tier program module; and the third-tier program modules each returning to the second-tier module a similarity value resulting from comparison of the new document vector to a respective composite vector, the second-tier module returning a best match similarity value to the first-tier module representing a greatest measure of similarity of the new document to a respective plurality of documents stored under control of a respective third-tier program module to determine routing of the document to a selected second-tier program module from among a plurality of second-tier program modules.

2. The computer method of claim 1, wherein
said first-tier program module transmits said new document to the second-tier program module for further transmission to a selected one of said third-tier program modules; and
wherein upon receiving said new document, said third-tier program module transmits the new document vector to at least one fourth-tier program module;
wherein the fourth-tier program modules compares the new document vector to a respective composite vector to determine similarity of the new document to the plurality of documents stored in the second computer under the control of the fourth-tier program module;
wherein the fourth-tier program modules transmits a similarity value to the third-tier program module; and
based on evaluation of the similarity value returned by said fourth-tier program module, said third-tier program module determines whether the new document is to be transmitted to the fourth-tier program module.

3. The method of claim 1, wherein
based on evaluation of the similarity value returned by the second-tier program module, said first-tier program module transmits the new document to the second-tier program module for storage under control of an existing third-tier and an existing fourth-tier program module, which are in communication with the second-tier program module.

4. The method of claim 1, wherein
based on evaluation of the similarity value returned by the second-tier program module, said first-tier program module transmits the new document to the second-tier program module for storage under control of a third-tier program module and a fourth-tier program module, which are to be created by the second-tier program module.

5. The method of claim 1, wherein
each new document has been converted to a data file using a tag-identifier language before determining the document vector.

6. The method of claim 1, 2, 3, 4, or 5, further comprising
searching for stored documents according to a search query having at least one term and identifying the documents found in the search; and
displaying the documents so as to indicate similarity of the documents to each other.

7. The method of claim 6, wherein the documents are displayed as nodes of a tree structure having links and nodes in which similarity of documents is indicated by proximity of nodes to each other and by a length of links connecting the nodes to a common vertex.

8. The method of claim 7, wherein the documents are displayed as nodes of a tree structure that represents documents stored under control of at least one third-tier program module.

9. The method of claim 1, 2, 3, 4, or 5, wherein the information, including the new document, is collected from a plurality of Internet web sites.

10. The method of claim 1, wherein the first-tier program module and the second-tier program module are agent program modules that are originated in JAVA computer language.

11. The method of claim 1, further comprising:
the first-tier program module transmitting the new document vector to a second, second-tier program module operating on a third computer in the computer system;
the second, second-tier program module transmitting a similarity value to said first-tier program module which represents a comparison of the new document vector to at least one composite vector characterizing a similarity of a plurality of documents stored in the third computer; and
based on said similarity value received from each of said second-tier program modules, said first-tier program module determining whether said new document should be transmitted to a selected one of said second-tier program modules for storage in the computer system.

12. A computer system for storing, retrieving and displaying information, the computer system being operable on at least one computer having a software operating system, the computer system comprising:
a first-tier, multiplexing program module running on a first computer for receiving a new document originating from an information source and for calculating a new document vector for the new document, and for transmitting said new document vector to at least one second-tier program module; and
a second-tier program module running on a second computer;
wherein the second-tier program module transmits the document vector to a plurality of third-tier program modules operating on the second computer in the computer system;
the third-tier program modules each storing a composite vector representing the similarity of a respective plurality of documents stored in the second computer under the control of the respective third-tier program module; and
the third-tier program modules each receiving the document vector for the new document and comparing the document vector to a respective composite vector to determine similarity of the new document to the plurality of documents stored in the second computer under control of the third-tier program module;
the third-tier program module each returning a similarity value to the second-tier module resulting from comparison of the new document vector to a respective composite vector, the second-tier module returning a best match similarity value to the first-tier, multiplexing program module representing a greatest measure of similarity of the new document to a respective plurality of documents stored under control of a respective third-tier program module to determine routing of the document to a selected second-tier program module from among a plurality of second-tier program modules.

13. The computer system of claim 12, wherein
said multiplexing program module transmits said new document to the second-tier program module for further transmission to a selected one of said third-tier program modules; and
wherein upon receiving said new document, said third-tier program module transmits the new document vector to at least one fourth-tier program module;
wherein the fourth-tier program module compares the new document vector to a respective composite vector to determine similarity of the new document to the plurality of documents stored in the second computer under the control of the fourth-tier program module;

wherein the fourth-tier program module transmits a similarity value to the third-tier program module; and based on evaluation of the similarity value returned by said fourth-tier program module, said third-tier program module determines whether the new document is to be transmitted to the fourth-tier program module.

14. The computer system of claim 12, wherein based on evaluation of the similarity value returned by the second-tier program module, said first-tier, multiplexing program module transmits the new document to the second-tier program module for storage under control of an existing third-tier and an existing fourth-tier program module, which are in communication with the second-tier program module.

15. The computer system of claim 12, wherein based on evaluation of the similarity value returned by the second-tier program module, said multiplexing program module transmits the new document to the second-tier program module for storage under control of a third-tier program module and a fourth-tier program module, which are provided by the second-tier program module.

16. The computer system of claim 12, further comprising:

a second, second-tier program module running on a third computer for receiving the new document from the first-mentioned second-tier program module; and wherein said first-mentioned second-tier program module running on said second computer and said second, second-tier program module running on said third computer each compare the new document vector to a respective composite vector to determine a similarity value representing the similarity of the new document to the documents already stored in the second computer and the third computer, respectively, and wherein each of said second-tier program modules communicate said respective similarity value to said multiplexing program module for a determination in which of the second computer and the third computer the document should be stored for access.

17. The computer system of claim 12, 13, 14, or 15 further comprising:

a computer display and a display program module for displaying the documents so as to indicate similarity of the documents to each other.

18. The computer system of claim 17, wherein the documents are displayed by the display program module as nodes of a tree structure having links and nodes in which similarity of documents is indicated by proximity of nodes to each other and by a length of links connecting the nodes to a common vertex.

19. The computer system of claim 18, wherein the documents are displayed by the display program module as nodes of a tree structure that represents documents stored under control of at least one third-tier program module.

20. The computer system of claim 12, 13, 14,or 15 wherein the information, including the new document, is collected from a plurality of Internet web sites.

21. The computer system of claim 12, wherein the multiplexing program module and the second-tier program modules are agent program modules originated in JAVA computer language.

22. The method of claim 1, wherein said determining the new document vector further comprises determining the words in the new document, determining the frequency of the words, and executing statistical computations concerning word frequency.

23. The method of claim 1, wherein said new document vector is not based on a pre-defined theme for any of the documents, wherein said composite vector is not based on any theme for any of the documents and wherein said new document vector is compared to said composite vector to determine routing of a document for storage.

24. The computer system of claim 12, wherein said new document vector is based on words in the new document, frequency of the words in the new document, and statistical computations concerning word frequency.

25. The computer system of claim 12, wherein said new document vector is not based on a pre-defined theme for any of the documents and wherein said composite vector is not based on any theme for any of the documents and wherein said new document vector is compared to said composite vector to determine routing of a document for storage.

* * * * *